US009361088B2

(12) United States Patent
Chen et al.

(10) Patent No.: US 9,361,088 B2
(45) Date of Patent: *Jun. 7, 2016

(54) INITIALIZATION AND UPDATE OF SOFTWARE AND/OR FIRMWARE IN ELECTRONIC DEVICES

(75) Inventors: Shao-Chun Chen, Aliso Viejo, CA (US); Patrick O'Neill, Dana Point, CA (US); Peter L. Sotos, Orange, CA (US); Jeong M. Lim, Seoul (KR); Sidney Andrew Jacobi, San Marcos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 774 days.

This patent is subject to a terminal disclaimer.

(21) Appl. No.: 12/057,067

(22) Filed: Mar. 27, 2008

(65) Prior Publication Data

US 2008/0184220 A1 Jul. 31, 2008

Related U.S. Application Data

(63) Continuation of application No. 10/411,784, filed on Apr. 11, 2003, now Pat. No. 7,409,685, which is a
(Continued)

(51) Int. Cl.
*G06F 9/44* (2006.01)
*G06F 9/00* (2006.01)
*G06F 9/445* (2006.01)

(52) U.S. Cl.
CPC ....................................... *G06F 8/65* (2013.01)

(58) Field of Classification Search
CPC ........................................................ G06F 8/65

USPC ............................................................ 717/170
See application file for complete search history.

(56) References Cited

U.S. PATENT DOCUMENTS

| | | | |
|---|---|---|---|
| 4,344,091 A | 8/1982 | Gardner et al. | |
| 4,429,387 A | 1/1984 | Kaminski | |
| 5,155,847 A | 10/1992 | Kirouac et al. | |
| 5,261,055 A | 11/1993 | Moran et al. | |
| 5,274,823 A * | 12/1993 | Brenner et al. | ............... 710/200 |

(Continued)

FOREIGN PATENT DOCUMENTS

| | | |
|---|---|---|
| CA | 2339923 | 3/2000 |
| JP | 8202626 | 8/1996 |

(Continued)

OTHER PUBLICATIONS

European Search Report, Appln. No. 04759830.5 dated Jan. 18, 2008.

(Continued)

*Primary Examiner* — James D Rutten
(74) *Attorney, Agent, or Firm* — HP Inc Patent Department

(57) ABSTRACT

A system and method to effectively and efficiently update a version of firmware resident in a device memory is provided. A method of identifying one or more versions of firmware is provided by way of initializing a device memory with a known pattern. In addition, the amount of free unused memory space may be identified and calculated in a device memory. The system and method generates software update packages that are minimal in size providing cost benefit to a manufacturer and convenience to a user.

19 Claims, 13 Drawing Sheets

Related U.S. Application Data continuation-in-part of application No. 10/311,462, filed as application No. PCT/US01/44034 on Nov. 19, 2001, now abandoned.

(60) Provisional application No. 60/373,422, filed on Apr. 12, 2002, provisional application No. 60/373,421, filed on Apr. 12, 2002, provisional application No. 60/373,423, filed on Apr. 12, 2002, provisional application No. 60/372,066, filed on Apr. 12, 2002, provisional application No. 60/249,606, filed on Nov. 17, 2000.

(56) References Cited

U.S. PATENT DOCUMENTS

| | | | |
|---|---|---|---|
| 5,442,771 | A | 8/1995 | Filepp et al. |
| 5,479,637 | A | 12/1995 | Lisimaque et al. |
| 5,479,656 | A * | 12/1995 | Rawlings, III ........ G06F 3/0613 |
| 5,481,713 | A | 1/1996 | Wetmore et al. |
| 5,491,807 | A | 2/1996 | Freeman et al. |
| 5,579,522 | A | 11/1996 | Christeson et al. |
| 5,596,738 | A | 1/1997 | Pope |
| 5,598,534 | A | 1/1997 | Haas |
| 5,608,910 | A | 3/1997 | Shimakura |
| 5,623,604 | A | 4/1997 | Russell et al. |
| 5,666,293 | A | 9/1997 | Metz et al. |
| 5,689,712 | A | 11/1997 | Heisch |
| 5,752,039 | A | 5/1998 | Tanimura |
| 5,778,440 | A | 7/1998 | Yiu et al. |
| 5,790,974 | A | 8/1998 | Tognazzini |
| 5,878,256 | A | 3/1999 | Bealkowski et al. |
| 5,901,330 | A | 5/1999 | Sun et al. |
| 5,960,445 | A | 9/1999 | Tamori et al. |
| 6,009,497 | A | 12/1999 | Wells et al. |
| 6,038,636 | A | 3/2000 | Brown, III et al. |
| 6,064,814 | A | 5/2000 | Capriles et al. |
| 6,073,206 | A | 6/2000 | Piwonka et al. |
| 6,073,214 | A | 6/2000 | Fawcett |
| 6,080,207 | A | 6/2000 | Kroening et al. |
| 6,088,759 | A | 7/2000 | Hasbun et al. |
| 6,105,063 | A | 8/2000 | Hayes, Jr. |
| 6,112,024 | A | 8/2000 | Almond et al. |
| 6,112,197 | A | 8/2000 | Chatterjee et al. |
| 6,126,327 | A | 10/2000 | Bi et al. |
| 6,128,695 | A | 10/2000 | Estakhri et al. |
| 6,128,713 | A * | 10/2000 | Eisler et al. .................... 711/159 |
| 6,157,559 | A | 12/2000 | Yoo |
| 6,163,274 | A | 12/2000 | Lindgren |
| 6,198,946 | B1 | 3/2001 | Shin et al. |
| 6,209,127 | B1 * | 3/2001 | Mori et al. .................... 717/162 |
| 6,212,489 | B1 * | 4/2001 | Klein et al. .................... 703/13 |
| 6,279,153 | B1 | 8/2001 | Bi et al. |
| 6,292,492 | B1 | 9/2001 | Bonomi et al. |
| 6,311,322 | B1 | 10/2001 | Ikeda et al. |
| 6,397,385 | B1 * | 5/2002 | Kravitz .................... 717/173 |
| 6,438,585 | B2 | 8/2002 | Mousseau et al. |
| 6,442,660 | B1 | 8/2002 | Henerlau et al. |
| 6,487,717 | B1 * | 11/2002 | Brunemann et al. .......... 717/173 |
| 7,124,289 | B1 * | 10/2006 | Suorsa .................... G06F 8/61 707/999.2 |
| 7,409,685 | B2 * | 8/2008 | Chen et al. .................... 717/170 |
| 2001/0029178 | A1 | 10/2001 | Criss et al. |
| 2001/0047363 | A1 | 11/2001 | Peng |
| 2001/0048728 | A1 | 12/2001 | Peng |
| 2002/0078209 | A1 | 6/2002 | Peng |
| 2002/0116261 | A1 | 8/2002 | Moskowitz et al. |
| 2002/0120810 | A1 | 8/2002 | Brouwer |
| 2002/0131404 | A1 | 9/2002 | Mehta et al. |
| 2002/0152005 | A1 | 10/2002 | Bagnordi |
| 2002/0156863 | A1 | 10/2002 | Peng |
| 2002/0157090 | A1 | 10/2002 | Anton, Jr. |
| 2003/0022663 | A1 | 1/2003 | Rajaram et al. |
| 2003/0023964 | A1 | 1/2003 | Rajaram et al. |
| 2003/0033599 | A1 | 2/2003 | Rajaram et al. |
| 2003/0037075 | A1 | 2/2003 | Hannigan et al. |
| 2003/0061384 | A1 | 3/2003 | Nakatani |
| 2003/0066062 | A1 | 4/2003 | Brannock et al. |
| 2003/0163661 | A1 * | 8/2003 | Marion et al. ................. 711/170 |

FOREIGN PATENT DOCUMENTS

| | | |
|---|---|---|
| KR | 2002-0034228 | 5/2000 |
| KR | 2001-0100328 | 11/2001 |
| WO | 0106798 | 1/2001 |

OTHER PUBLICATIONS

"Focus on Open View a Guide to Hewlett-Packard's Network and Systems Management Platform," Nathan J. Muller, pp. 1-291, CBM Books, published 1995.

"Client Server Computing in Mobile Environments," J. Jing et al., ACM Computing Surveys, vol. 31, Issue 2, pp. 117-159, ACM Press, Jul. 1999.

"ESW4: Enhanced Scheme for WWW Computing in Wireless Communication Environments," S. Hadjiefthymiades, et al. ACM SIGCOMM Computer Communication Review, vol. 29, Issue 5, pp. 24-35, ACM Press, Oct. 1999.

"Introducing Quality-of-Service and Traffic Classes in Wireless Mobile Networks," J. Sevanto, et al. Proceedings of the 1st ACM International Workshop on Wireless Mobile Multimedia, pp. 21-29, ACM Press, 1998.

"Any Network, Any Terminal, Anywhere," A Fasbender et al., IEEE Personal Communications, Apr. 1999, pp. 22-30, IEEE Press, 1999.

Meyers, W.J., "Design of a Microcode Link Editor", Proceedings of the 13th Annual Workshop on Microprogramming, pp. 165-170.

Computer Dictionary, Microsoft Press, 2002, pp. 380 and 423.

Koenig et al. "Re: ext2—available+used not equal to total" Dec. 31, 1998, acessed on Oct. 9, 2007 from <http://www.uwsg.iu.edu/hypermail/linux/kernel/9901.0/0270.html>, Linux Kernel Archive, 1 page.

\* cited by examiner

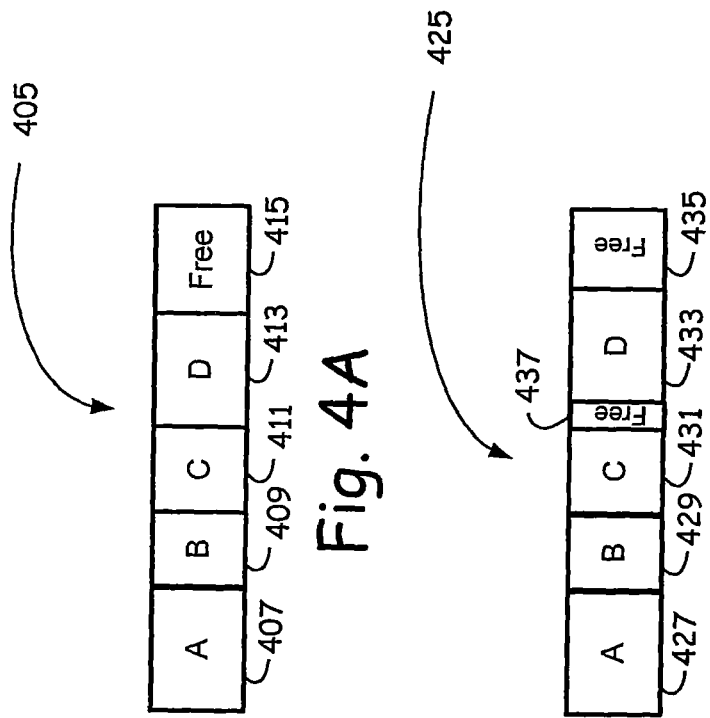

```
-o image.out
-m image.map

MEMORY {
  FLASH (RX) : origin= 0x10000, length = 0x70000
  RAM   (RWXI): origin= 0x100000, length = 0x40000
}

SECTIONS
{
 .text  : load = FLASH
 .cinit : load = FLASH
 .const : load = FLASH
 .data  : load = FLASH
 .bss   : load = RAM
}
```

Fig. 6A

```
-o image.out
-m image.map

MEMORY {
    FLASH1 (RX) : origin= 0x10000, length = 0x10000
    FLASH2 (RX) : origin= 0x20000, length = 0x20000
    FLASH3 (RX) : origin= 0x40000, length = 0x20000
    FLASH4 (RX) : origin= 0x60000, length = 0x20000
    RAM   (RWXI): origin= 0x100000, length = 0x40000
}

SECTIONS
{

.rom1   : load = FLASH2
  {
    C:\TIMAP\Gaps\img1\TI\Release\uadebug.obj (.text, .data, .const, .cinit)
    C:\TIMAP\Gaps\img1\TI\Release\uadevice.obj (.text, .data, .const, .cinit)
    C:\TIMAP\Gaps\img1\TI\Release\uadeviceasm.obj (.text, .data, .const, .cinit)
  }

.rom2   : load = FLASH3
  {
    C:\TIMAP\Gaps\img1\TI\Release\uaflash.obj (.text, .data, .const, .cinit)
    C:\TIMAP\Gaps\img1\TI\Release\uainit.obj (.text, .data, .const, .cinit)
    C:\TIMAP\Gaps\img1\TI\Release\samson.obj (.text, .data, .const, .cinit)
    C:\TIMAP\Gaps\img1\TI\Release\link1.obj (.text, .data, .const, .cinit)
  }

.rom3   : load = FLASH4
  {
    C:\TIMAP\Gaps\img1\TI\Release\uamemory.obj (.text, .data, .const, .cinit)
    C:\TIMAP\Gaps\img1\TI\Release\uaui.obj (.text, .data, .const, .cinit)
    C:\TIMAP\Gaps\img1\TI\Release\uabootmem.obj (.text, .data, .const, .cinit)
    C:\TIMAP\Gaps\img1\TI\Release\link2.obj (.text, .data, .const, .cinit)
    C:\TIMAP\Gaps\img1\TI\Release\uistring.obj (.text, .data, .const, .cinit)
  }

.text   : load = FLASH1
  .cinit  : load = FLASH1
  .const  : load = FLASH1
  .data   : load = FLASH1
  .bss    : load = RAM
}
```

Fig. 6B

INITIALIZATION AND UPDATE OF SOFTWARE AND/OR FIRMWARE IN ELECTRONIC DEVICES

RELATED APPLICATIONS

This application is a continuation of U.S. patent application Ser. No. 10/411,784 titled "Initialization And Update Of Software And/Or Firmware In Electronic Devices", filed Apr. 11, 2003, which is a continuation-in-part of U.S. patent application Ser. No. 10/311,462, titled "System and Method for Updating and Distributing Information", filed Dec. 13, 2002, and which makes reference to, claims benefit of, and claims priority to U.S. Provisional Patent Application Ser. No. 60/373,422 titled "Update Package Generation And Distribution Network", filed Apr. 12, 2002; U.S. Provisional Patent Application Ser. No. 60/373,421 titled "Pattern Detection Preprocessor In An Update Generation System", filed Apr. 12, 2002; U.S. Provisional Patent Application Ser. No. 60/373,423 titled "Layout Preprocessor In An Update Generation System", filed Apr. 12, 2002; and U.S. Provisional Patent Application Ser. No. 60/372,066 titled "Memory Initialization System For Initializing A Memory Image With A Pattern", filed Apr. 12, 2002. U.S. patent application Ser. No. 10/311,462 is the National Stage filing of PCT Application Ser. No. PCT/US01/44034, titled "System and Method for Updating and Distributing Information", filed Nov. 19, 2001, which claims priority to U.S. Provisional Patent Application Ser. No. 60/249,606, filed Nov. 17, 2000. The complete subject matter of each of the above is incorporated herein by reference in its entirety. With respect to the present application, Applicants hereby rescind any disclaimer of claim scope made in the parent application or any predecessor or related application. The Examiner is advised that any previous disclaimer of claim scope, if any, and the alleged prior art that it was made to allegedly avoid, may need to be revisited. Nor should a disclaimer of claim scope, if any, in the present application be read back into any predecessor or related application.

This application is also related to U.S. patent application Ser. No. 10/411,835 titled "Update Package Generation And Distribution Network", filed Apr. 11, 2003, and U.S. patent application Ser. No. 10/412,045 titled "Pattern Detection Preprocessor In An Electronic Device Update Generation System", filed Apr. 11, 2003, the complete subject matter of each of which is hereby incorporated by reference, in its entirety.

This application is also related to the following co-pending applications, each of which is hereby incorporated herein by reference in its entirety:

| Ser. No. | Title | Filed | Inventors |
| --- | --- | --- | --- |
| 10/411,835 | Update Package Generation and Distribution Network | Apr. 11, 2003 | O'Neill Rao |
| 10/412,045 | Pattern Detection Preprocessor in an Electronic Device Update Generation System | Apr. 11, 2003 | Chen O'Neill Rao Lilley |

FEDERALLY SPONSORED RESEARCH OR DEVELOPMENT

[Not Applicable]

MICROFICHE/COPYRIGHT REFERENCE

[Not Applicable]

TECHNICAL FIELD

The present invention relates generally to the process of updating software in electronic devices in general, and, more specifically, to the specification and subsequent execution of software update activities in such devices.

BACKGROUND OF THE INVENTION

Electronic devices such as mobile phones, personal digital assistants, pagers, and interactive digital appliances have become indispensable as a tool as the number of features and functions they provide increases. As technology continues to evolve, a manufacturer of such devices will find it imperative to update these devices with revised software that enables a number of new features and functions.

The term "software" used herein is intended to include not only software, but also or alternatively firmware. Similarly, the term "firmware" used herein is intended to include not only firmware, but also or alternatively software.

When existing software in memory of an electronic device must be updated as a result of a version upgrade, the new version of the software may require more memory space than the existing version. An attempt to replace the existing version with the new version by replacement with new software may cause a shifting or relocation of adjacent code not related to the application software. Such relocations require the modification of software code in order to provide continued operation of the updated feature or function. These modifications often involve re-compiling any software code that is affected by address references to the relocated code. As a result, the size of an update may be quite large. The effects of shifting and relocation of adjacent software code as a part of a software update may result in significant costs to a manufacturer. Furthermore, the time it takes to update a software may increase due to a large update size, and this provides an inconvenience to any user.

In order to perform a software update, it is important to evaluate the free memory space available should the update size occupy a larger space than the existing software. However, it is often difficult to assess the amount of free or unused memory available in an electronic device's memory because the free space may contain un-initialized random bit patterns. Free or unused memory in electronic devices provided by different manufacturers is usually not initialized, making it difficult to determine the location and size of any unused or free space. When performing updates of firmware in an electronic device, the amount of unused memory required for installation is often critical.

During a manufacturing cycle, a manufacturer typically burns copies of identical software modules for their devices. However, the unused or free space may not have a consistent binary pattern. As a result, any two similar devices with the same make and model may often end up with different memory (ROM, RAM or FLASH) snapshots or images. When attempting to determine the difference between versions of software resident in the memory of any two devices, any unused space in either memory that contains random un-initialized sequences makes it difficult to compare the two.

In the case of mobile handsets, the software that is often updated and stored in read-only memory (ROM) or programmable ROM (PROM) is called firmware. Firmware is often responsible for the behavior of a system when it is first switched on and is used to properly boot up a mobile handset when powered up. The unused memory space generated by a particular firmware image may be filled with a random sequence of binary data. This results in firmware images that are not necessarily consistent across handsets with the same firmware version. In comparing the firmware images from two different handsets of the same type, the firmware may appear to be significantly different from each other, when in reality they may be identical. As a result, it becomes a difficult task to easily identify the version of software loaded in an electronic device based on the image it presents. Further, it becomes difficult to determine whether a device requires an update.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system is provided to effectively update a software and/or firmware in an electronic device. The update system comprises a memory layout preprocessor used in formulating a memory layout of the firmware, a user interface to provide input data from a user, a binary image creator used to generate a firmware initialization binary pattern, a generator to provide a desirable software update package for incorporation into a device memory, a software repository for storing binary image patterns and software modules and objects, an external computer system for storing memory layout specifications, an update agent used for processing the software update package generated by the generator, and an electronic device containing the device memory in which the firmware to be updated is resident.

A method is provided for effectively updating a software and/or firmware in an electronic device. In one embodiment, the version of software resident in a device's memory and the location and size of unused free memory is determined by initializing the device's memory with one or more pre-determined binary patterns. In one embodiment, buffer spaces are inserted between software modules in a device's firmware to allow for expansion of a particular software module by way of a future update. In one embodiment, one or more software modules (or objects) are inserted into pre-configured code expansion slots in device's firmware. The memory space that remains after all objects are inserted into a slot provides buffer space to allow for future updates to these objects.

These and other advantages, aspects, and novel features of the present invention, as well as details of illustrated embodiments, thereof, will be more fully understood from the following description and drawings.

BRIEF DESCRIPTION OF THE DRAWINGS

FIG. 4A is a relational block diagram illustrating an arrangement of software modules and remaining free memory space in a device memory in accordance with an embodiment of the invention.

FIG. 4B is a relational block diagram illustrating an arrangement of software modules, a block of random free memory space between two software modules, and remaining free memory space in a device memory in accordance with an embodiment of the invention.

FIG. 6A illustrates an exemplary input that is processed by a layout processor to yield a scatter load file output in accordance with an embodiment of the invention.

FIG. 6B illustrates an exemplary scatter load output from a layout processor in accordance with an embodiment of the invention.

DETAILED DESCRIPTION OF THE INVENTION

Figure 1:
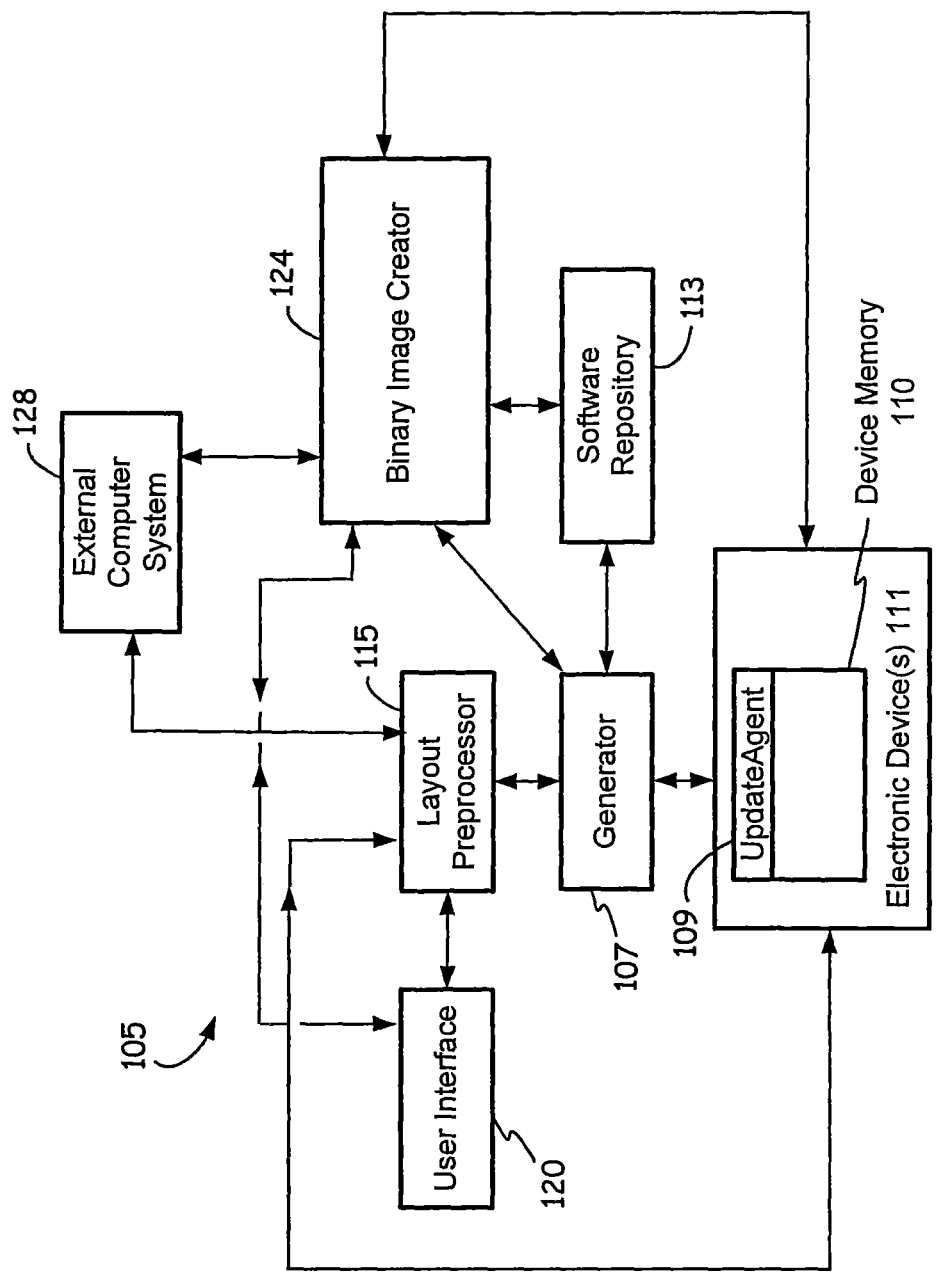
FIG. 1 is a block diagram of a memory initialization and software update system for an electronic device in accordance with an embodiment of the invention.

FIG. 1 is a block diagram of a memory initialization and software update system in accordance with an embodiment of the invention. The memory initialization and software update system 105 comprises a generator 107 that generates a software update package for an electronic device 111 with device memory 110 by way of a memory layout specification, a software repository 113, an update agent 109 residing within the electronic device 111 that can apply the update package onto the electronic device 111 to upgrade any existing software resident in the device memory 110 of the electronic device 111, a layout preprocessor 115 that facilitates the introduction of unused memory space for software packages, a user interface 120 to allow input of parameters related to the memory layout specification, and a binary image creator 124 that generates binary image packages for initializing of the device memory 110 of the electronic device 111. The software repository 113 may store software packages generated by the generator 107, as well as binary image packages generated by the binary image creator 124. The software packages generated by the generator 107 comprise software required by the device memory 110 of the electronic device 111 to function properly. The software packages may comprise a number of software modules. Typically, the software (or firmware) is executed upon power up of the electronic device 111 in preparation for normal operation by the user. An external computer system 128 may be used as a source to provide a memory layout specification to the layout preprocessor 115. The terms software package, update package, and software update package used herein includes instructional code that may be processed by the update agent 109 in the creation of updated software in the electronic device 111. Herein, the concept of initializing a device memory 110 by a binary pattern occurs by way of creating a binary data image that is subsequently loaded onto the device memory 110 of the electronic device 111.

The electronic device 111 comprises any electronic device such as an exemplary mobile handset, personal digital assistant (PDA), computer, pager, interactive digital appliance, or the like. Within the electronic device 111 resides a device memory 110 capable of storing and running firmware or software for properly booting up and subsequently operating the electronic device 111. Exemplary device memory 110 includes flash memory, random operating memory (ROM), electrically programmable ROM, or the like.

The software repository 113 may comprise one or more computer storage devices such as a hard drive, optical drive, CD-ROM drive, DVD drive, tape drive, or other like device. As illustrated in FIG. 1, the software repository 113 interfaces with the binary image creator 124 and the generator 107.

The update agent 109 comprises hardware and/or software configured to provide processing of a software package provided to it by the generator 107. The update agent 109 may reside within the electronic device 111.

The external computer system 128 comprises one or more computers in a network providing one or more storage devices with storable media. The external computer system 128 interfaces with the binary image creator 124 or layout preprocessor 115.

The user interface comprises a keyboard or other input device, as well as a monitor or visual communications device capable of permitting a user to input commands and data into the software update system 105.

The binary image creator 124 configures a binary image by way of a memory layout specification for a given device memory 110. The binary image creator 124 may comprise a combination of hardware and software capable of generating binary image patterns. It is contemplated the memory layout specification may be obtained from the device memory 110 or from a storage device within an external computer system 128 or by manual input by way of a user interface 120 connected to the layout preprocessor 115. The memory layout specification provides information regarding the characteristics of the device memory 110 in the electronic device 111. In addition, the size of the unused memory space to be deployed and the location or position of these spaces comprise the memory layout specification.

The layout preprocessor 115 comprises hardware and/or software capable of utilizing a memory layout specification. It generates a layout configuration file often called a scatter load file (to be discussed later) that maps the memory locations of software modules loaded into the device memory 110. The configuration file is then provided to the generator 107 in which a suitable software update package is generated for the electronic device 111.

The generator 107 comprises hardware and software capable of generating a software package for direct incorporation into a device memory image or may store the software package in the software repository 113 for subsequent retrieval and use by one or a plurality of software update systems 105. It is contemplated the software package comprises either a new software package that is loaded in a new electronic device 111 at the time of manufacture or a software update package that is installed as a revision to an existing software package in an electronic device 111. Incorporation of the software package into the device memory 110 is by way of an update agent 109 resident within the electronic device 111. The generator 107 typically creates a software package by comparing an existing software image resident in the device memory 110 of the electronic device 111 to a newer version of the same software that may be stored in the software repository 113 or the external computer system 128. The generator 107 computes differences in the software images and creates an appropriate software package. The update agent 109 in the device 111 is capable of applying the update package onto the electronic device 111 by processing and executing the instructions provided with the software package.

The generator 107 determines that an electronic device 111 requires a software update by way of a binary image previously stored onto the device memory 110 of the electronic device 111 by way of the binary image creator 124. The binary image package may be generated by the binary image creator 124 for use by the generator 107 in the incorporation of new or updated software into the device 111. The binary image package generated by the binary image creator 124 and the software package generated by the generator 107 may be installed into a plurality of electronic devices that are similar or identical in design and function to the electronic device 111. The binary image package may be directly transmitted to the electronic device 111 by the binary image creator 124 for installation into the device memory 110. It is contemplated the update agent 109 may facilitate installation of the binary image. Different binary image packages comprising distinct binary patterns may be created. One or more of these patterns may be installed in a plurality of one or more types of devices as necessary. When interfaced with the generator 107, the different versions of installed binary images in the plurality of electronic devices may be easily analyzed or compared by the generator 107 in order to determine differences in software version. Further, the implementation of these unique binary images or patterns may allow the generator 107 to differentiate unused memory space from software resident in the device memory 111 and calculate any available free or unused memory space. It is contemplated the generator 107 may interface with an electronic device 111 by way of wireless or wireline data communications.

By populating the unused portion of memory with binary patterns characterized by a known and consistent value, a version of software that exists in a particular electronic device 111 may be identified. Further, a comparison of different versions of software resident, in a device memory 110 should yield a specific difference image. For example, a generator 107 that is configured to process a difference image may subtract a version n image from a version n+m image to generate a resulting difference image, necessitating that a specific software update package be generated and incorporated into all electronic devices using a version n image.

In general, the binary image creator 124 creates a binary memory image for initialization of the device memory 110. A finalized binary image may be loaded into the device memory 110 by the binary image creator 124 before any software package is loaded onto the device memory 110 by the generator 107. In other instances, software modules may be incorporated into the binary memory image prior to loading. In one embodiment, the binary image creator 124 is responsible for assembling a finalized memory image that is subsequently programmed or flashed into the device memory 110 of the electronic device 111, such as during manufacturing.

Furthermore, it is contemplated that predetermined binary images may be stored within the software repository 113 for future use. Predetermined binary images may be comprised of a pattern of binary or hexadecimal characters that create a unique image. For example, the device memory 110 may be initialized with the value 0xFFFF throughout its entire memory. Other values or combination of values may be employed in other embodiments. In one embodiment, the memory of the device memory 110 is segmented into multiple memory sections where each memory section is selectively initialized with a different predetermined memory pattern.

It is contemplated that various software packages representing different versions of software update packages may be saved in the software repository 113 by the generator 107 or loaded directly onto device memory 110 of one or more electronic devices 111. In one embodiment it is contemplated a software package may be incorporated into a binary image and then saved into the software repository 113 for future use by the generator 107. In one embodiment of the present invention, the values of the binary image pattern are consistent across electronic devices 111 with the same software or firmware version. The update agent 109 may serve to facilitate the incorporation of the binary image or software modules into the device memory 110.

In general, the binary image creator 124 may be used to initialize device memory 110 in different types of devices so that subsequent processing by the generator 107 may be accomplished. Such processing includes determining different versions of the same software or determining unused memory locations in a device memory 110.

Figure 2:
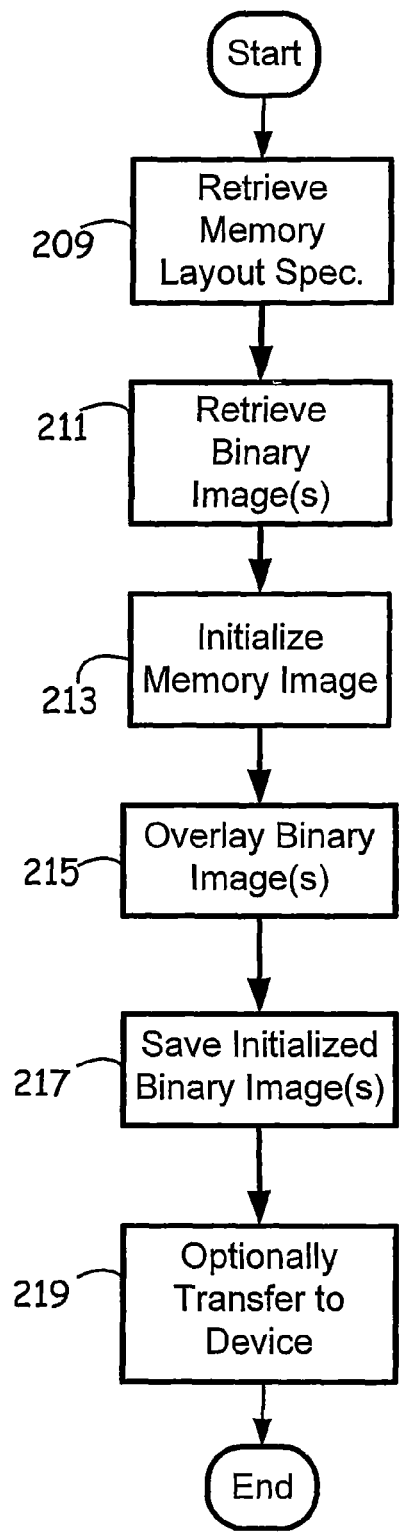
FIG. 2 is an operational flow diagram illustrating a method of initializing and updating software loaded in a device memory of an electronic device in accordance with an embodiment of the invention.

FIG. 2 is a process flow diagram illustrating an exemplary process of memory image initialization of device memory and subsequent loading of software packages, in accordance with an embodiment of the invention. At step 209, a binary image creator 124, such as that illustrated in FIG. 1, selectively retrieves a memory layout specification from an external computer system 128, from a device memory 110, or from user input through a user interface 120. Information such as number of memory, type of memory, and size of memory is provided by the memory layout specification for use by the binary image creator 124. Next, at step 211, an appropriate binary image pattern configured for use with the memory layout specification is selected and retrieved from a binary image repository 113. Then, at a next block 213, the binary image creator 124 may create one or more images for initializing one or more images it creates into one or more electronic devices 111. In other instances, the binary image creator 124 may configure a binary image comprising a pattern suitable for loading into a device memory for eventual or future use. This binary image may be stored in the software repository 113. Subsequently, at step 215, a generator 107 provides an image of one or more software packages or software module(s) to the electronic device 111 for incorporation into the device memory 110. Software associated with functionality of the update agent 109 may be incorporated into memory by way of modification of the binary image. The resulting image in memory is such that unused or free memory can be identified by means of the initialization process to correspond with a particular software package version, type of software, or types of software modules loaded into the device memory 110. In this fashion, a particular software version resident in device memory 110 may be identified. Later, at steps 217 and 219, the initialized binary images with written software module(s) are saved in a software repository 113 or loaded into one or more device memories 110 of electronic devices 111.

Figure 3A:
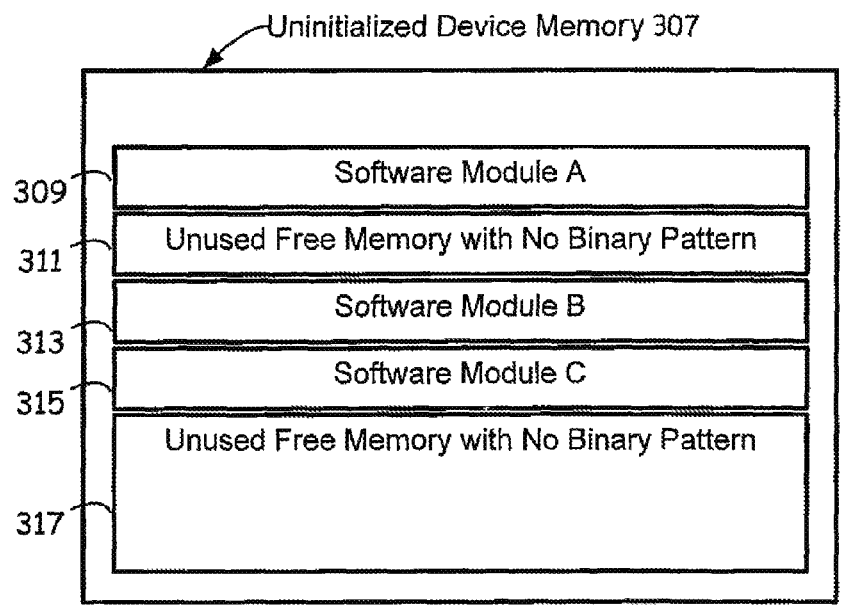
FIG. 3A is a diagram illustrating a memory image comprising a number of software modules and un-initialized free memory space configured for loading into an electronic device in accordance with an embodiment of the invention.

FIG. 3A is a block diagram illustrating exemplary software modules and unused free memory space resident in an uninitialized device memory 307 of an electronic device, in accordance with an embodiment of the invention. Exemplary software modules A 309, B 313 and C 315 are distributed in the uninitialized memory 307 with some amount of free memory available 311, 317, although the available free memory 311, 317 may be indistinguishable from memory occupied by the software modules A 309, B 313, and C 315, because the unused free memory 311, 317 is characterized by a random bit pattern. In addition, a comparison of images resident in un-initialized memories of two similar electronic devices by the generator 107 is likely to produce inconsistent difference images. As illustrated in FIG. 3A, unused free memory 317 is typically located at the end of the un-initialized memory 307 and an occasional unused free memory block 311 may occur at random. Software modules A 309, B 313, and C 315 may have adjacent free memory blocks introduced intentionally or by random chance.

Figure 3B:
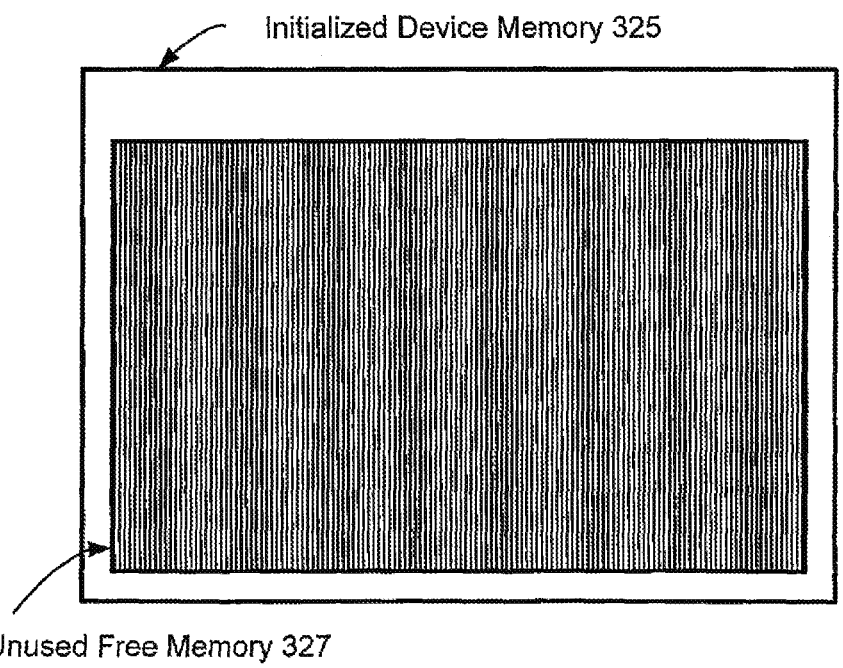
FIG. 3B is a diagram illustrating a device memory initialized with a pre-determined pattern in accordance with an embodiment of the invention.

FIG. 3B is a block diagram illustrating an exemplary memory image of an initialized device memory 325, in accordance with an embodiment of the invention. Here, the entire memory is initialized with a unique pre-determined pattern. After initialization, the unused memory 327 spans the entire device memory. Because the pattern is known and deterministic, any unused or free memory space within a device memory is easily detected after a software package is loaded into the initialized device memory 325. In addition, the pre-determined pattern provides a recognizable image that may be used as a tag or identifier to identify a particular software version. When comparing a device memory of an earlier software version with a current release version, the exemplary generator 107 shown in FIG. 1 may generate a unique difference image and subsequently correlate this with a corresponding software update package. In one embodiment of initializing a memory, a specific pattern may be employed for an entire device memory. In another embodiment, the device memory is segmented into multiple segments, and different patterns are stored into the different segments of the memory during initialization. In the latter method, it is contemplated the different patterns provide additional means to identify an image.

Figure 3C:
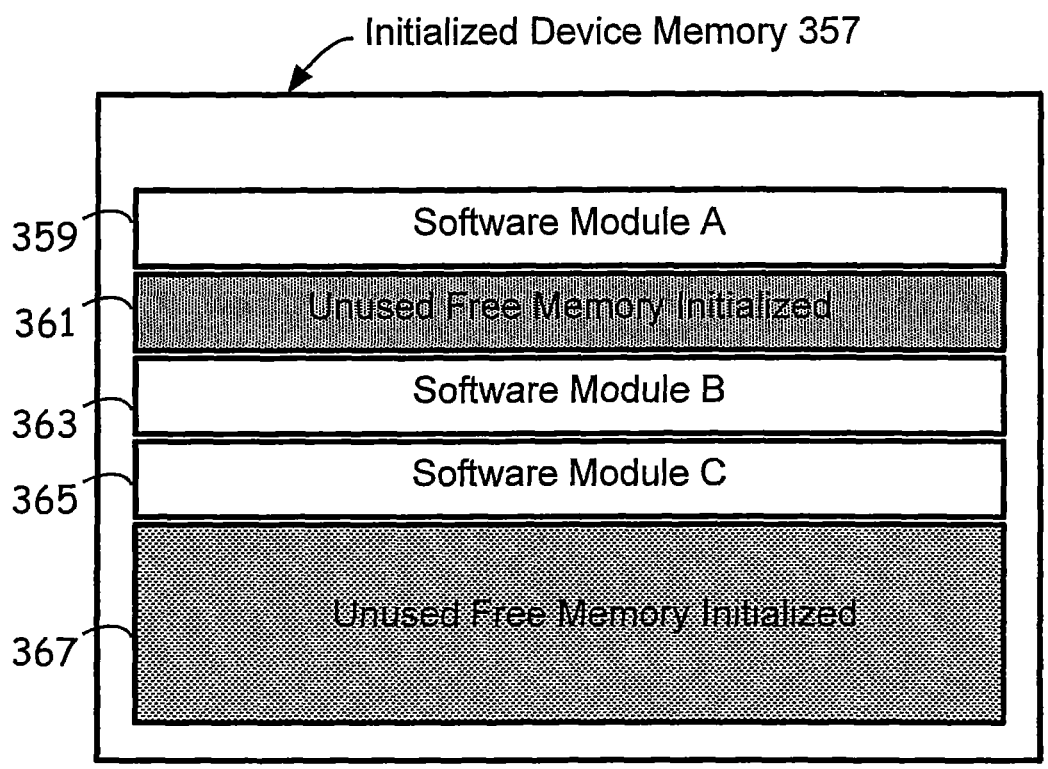
FIG. 3C is a diagram illustrating a memory image comprising a number of software modules and initialized free memory space configured for loading into an electronic device in accordance with an embodiment of the invention.

FIG. 3C is a block diagram of an exemplary embodiment in accordance with the present invention, illustrating software modules A 359, B 363, and C 365 written into initialized device memory 357. The software modules A 359, B 363 and C 365 are written onto memory that is initialized with a specific pattern making it possible to distinguish the available free memory 361 367 from memory currently occupied by software modules 359 363 365. In addition, the pre-determined pattern provides an image that may be used as a tag or identifier to identify a particular software version.

The electronic device 111 may determine a priority of use based upon the specific bit pattern employed in the unused free space. The electronic device 111 may consume portions of unused memory accordingly. For example, one or more portions of unused memory may be coded with a specific binary pattern indicating a priority or preference of use. If the electronic device 111 eliminates any software module, or if any software module relinquishes currently used memory, the released memory space can be selectively re-initialized with one or more specific patterns designating its preference for future use.

In one embodiment, the device memory 110 comprises a FLASH type of memory initialized entirely to a specific pattern comprising hexadecimal values of 0xFFFF. In another embodiment, the device memory 110 comprises four FLASH segments (FLASH1, FLASH2, FLASH3, FLASH4) specified to be 0x20000 in size, plus a RAM segment of size 0x40000. In one embodiment, the FLASH segments and the RAM segment are all initialized to the same pattern. In one embodiment, the FLASH and RAM segments are initialized using one or more patterns.

The layout preprocessor 115 determines available free space in the device memory 110 by way of a memory layout specification provided by the external computer system 128 or one or more electronic devices 111. The preprocessor 115 distributes available free space among individual software modules so as to provide effective and efficient updating of one or more software modules resident in the device memory 110. If the device 111 has extra free space that is currently not being used, the extra free space can be distributed among the available software modules and the software modules can be spread out in memory so as to provide free space segments, called reserved buffer spaces, juxtaposed to the software modules, providing a mechanism to constrain any update related changes to an individual software module and any dedicated free space around it.

In one embodiment of the present invention, one or more memory layout specifications are contained in the layout preprocessor 115 and may be selectively employed by the layout preprocessor 115 to distribute available free space among software modules in a device memory 110 by creating one or more reserved buffer spaces adjacent to each of the software modules. In another embodiment, a memory layout specification is retrieved by the layout preprocessor 115 from an external system 128, such as was described in FIG. 1.

In one embodiment, the memory layout specification specifies the layout of one or more sections of memory on the device, wherein the memory is comprised of one or more sections of FLASH memory and RAM memory. The origin and length of each section of FLASH or RAM is also specified along with assignments of one or more software modules to individual memory sections. The mapping of specific groups of code within a software module loaded onto the various sections of the memory (FLASH RAM) of the device are also specified. The layout preprocessor 115 incorporates the information contained in the memory layout specification in creating the reserved buffer spaces.

In one embodiment, the layout preprocessor 115 reorganizes and locates software modules on the electronic device 111 by computing the available free space and distributing this free space equally among the various software modules as reserved buffer spaces. In general, the layout preprocessor 115 is used as a pre-processing tool in configuring device memory images for different types of electronic devices 111 so that subsequent processing of one or more software modules by the generator 107 is easily performed with minimal change to unmodified software in the device memory 110. The layout preprocessor 115 may insert free spaces into one or more selected software modules in memory as a means to effectively localize changes to software that require additional free space.

FIG. 4A is a block diagram of an exemplary arrangement of software modules in a device memory 405 wherein the software modules A, B, C and D 407, 409, 411, 413 are positioned adjacent to each other without any free memory space separating the modules, according to an embodiment of the invention. Beyond the last module 413 is an unused or free memory segment 415 representing the remainder of unused memory. The software modules A 407, B 409, C 411, and D 413 may or may not be related to each other. Being adjacent to each other without any free memory between may cause a reorganization of links to addresses and references in other modules in order to modify or upgrade any one module. For example, if a new version of software module A 407 is loaded to replace the existing software module A 407, then replacing the existing version with the new version may require more or less memory space than what is currently utilized. Should additional memory space be required, a relocation or shifting of some or all modules B 409, C 411, and D 413 may occur. Relocation of software modules often necessitates changing the addresses of software jumps and references to addresses. Thus, an avalanche or overflow effect may occur in which an update to software module. A 407 results in changes to successive modules B 409, C 411, and D 413. Updates or revision to the last software module 413 may not produce an avalanche or overflow effect since it is adjacent to the free memory space 415 at the end of memory.

FIG. 4B is a block diagram of another exemplary layout of software modules in a memory displaying software modules that are adjacent to each other without free memory between them, according to an embodiment of the invention. As shown, a free memory segment 435 is characteristically located at the end of the memory block 425, and an occasional free memory block 437 may occur at random. It is contemplated the occasional free memory block 437 provides a small free memory space. Specifically, software modules A 427, B 429 and C 431 are adjacent to each other and modules A 427, B 429 do not have any adjacent free memory blocks while software module C 431 has a free memory block 437 adjacent to it, introduced not intentionally, but by random chance.

Such a memory layout may cause an avalanche or overflow effect described above for FIG. 4A, in which changes to any software module due to version upgrades are likely to cause relocation of one or more software modules downstream in the device memory 110. Relocation and shifting of memory may occur despite the occurrence of random free memory blocks 437 because they might not be large enough to accommodate the size requirements of software upgrades due to version changes, patches, or bug fixes.

Figure 5A:
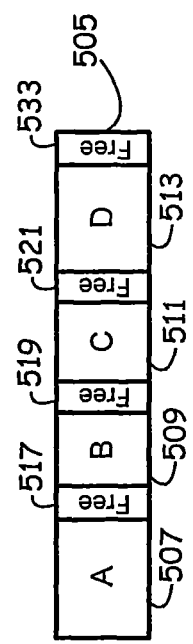
FIG. 5A is a relational block diagram illustrating a number of uniformly sized free memory spaces interspersed between a number of software modules in accordance with an embodiment of the invention.

FIG. 5A is a block diagram of an exemplary layout of software modules created by the layout processor 115 for a device memory 110 wherein uniform sized reserved buffer spaces are placed between the installed software modules A 507, B 509, C 511, and D 513, in accordance with an embodiment of the invention. By introducing reserved buffer spaces 517, 519, 521 and 533 adjacent to software modules A 507, B 509, C 511, and D 513, respectively, the layout processor 115 creates a layout for the software modules that accommodates changes to individual software modules without shifting other installed software modules. In fact, the size of each of the reserved buffer spaces may be adjusted so as to make relocation or shifting of other software modules unnecessary.

In one embodiment, the reserved buffer spaces 517, 519, 521 and 533 are configured to be the same size. In another embodiment, the reserved buffer spaces 517, 519, 521 and 533 vary based on the characteristics of the individual software modules A 507, B 509, C 511 and D 513.

Figure 5B:
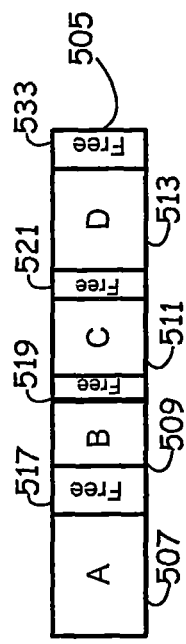
FIG. 5B is a relational block diagram illustrating a number of software modules and corresponding free memory spaces in which the size of a free memory space is proportional to the size of its corresponding software module in accordance with an embodiment of the invention.

FIG. 5B is a block diagram of an exemplary layout of software modules created by the generator 107 for a device memory 110 wherein non-uniform sized reserved buffer spaces 517, 519, 521 and 533 are positioned between the installed software modules so as to minimize the shifting effects associated with upgrading one or more software modules, according to an embodiment of the invention. Here, the size of each reserved buffer space is proportional to the size of the software module(s) it is associated with. For example, the size of reserved buffer space 517 adjacent to the software module A 507 is selected based upon and in proportion to the size of the corresponding software module A 507. Thus, reserved buffer space 519 is smaller than reserved buffer space 517 because the software module B 509 is smaller than the software module A 507.

The methods described in FIGS. 5A and 5B illustrate an embodiment where reserved buffer spaces are placed between all software modules. Hence, each software module has its own dedicated free memory space.

FIG. 6A illustrates an exemplary input instructional software code that is processed by the layout preprocessor 115 to generate a memory mapping or scatter load file (as will be discussed later) that incorporates reserved buffer spaces between software modules in the device, in accordance with an embodiment of the invention. It depicts a memory that comprises a FLASH segment of size 0x70000 and a RAM segment of size 0x40000. The software code incorporates information provided by a memory layout specification.

FIG. 6B is an exemplary output of a scatter load file that is created by the layout preprocessor 115 that incorporates reserved buffer spaces between software modules in a device, according to an embodiment of the invention. It depicts a memory that comprises four FLASH segments, with a total size 0x70000, with one FLASH segment (FLASH1) specified to be 0x1000 in length and three other FLASH segments (FLASH1, FLASH1, FLASH1) specified to be 0x20000 in size, in addition to a RAM segment of size 0x40000. For each of the FLASH segments, a mapping of individual software modules is also depicted by way of a data structure termed SECTIONS.

When a new software module update is generated by the generator 107 (as illustrated in FIG. 1) for an electronic device 111, additional memory space may be required beyond the space occupied by the existing software module. One method to provide reserved buffer spaces within a device memory of an electronic device is by allocating slots within memory in which one or more software modules or object files may be loaded. These slots may be filled with other object files as new or updated code is incorporated to the electronic device. It is contemplated the slot sizes would be designed to accommodate any anticipated expansion due to expected software updates. Using a design technique described below, the expansion slots are not completely filled by successive updates. Hence, successive slots in memory are not be affected by overflow from a preceding slot obviating any shifting or relocation of software code.

An embodiment of the layout preprocessor 115, termed a code expansion slot tool (CEST), may be used to implement the slot allocation technique described in the preceding paragraph. In this embodiment, a scatter load file is employed to configure memory layout information of software modules stored within a device memory 110. In this embodiment, the scatter load files provide configuration information concerning the assignment of software modules (or objects) to slots and the amount of memory space assigned per slot. Any reserved buffer spaces are determined for each slot based on remaining space after all objects have been assigned to a particular slot. It is contemplated the CEST comprises a software application with graphical user interface that operates on the scatter load file and is executed at the layout preprocessor 115 (illustrated in FIG. 1). The scatter load file is ultimately used by the generator 107 in creating a software package for incorporation into the device memory 110.

The user of the CEST may specify the number of slots a memory image should be divided into by way of the user interface 120. The user of the CEST may organize the memory slots within the image according to a likelihood of change of the objects within a slot. In one embodiment, the objects that are likely to change may be placed within a slot closest to the end of memory. In one embodiment, the objects that are likely to change may be placed within a slot of large memory size. These scatter load files may be stored on a per project basis in the external computer system 128 or in the layout preprocessor 115. It is contemplated the CEST may be used as a tool to write or formulate an appropriate scatter load file. If the CEST determines that the user does not have enough memory (i.e., ROM) to partition the entire software into the number of slots required, the CEST may be configured to provide an error message and a diagnostic report.

Figure 7A:
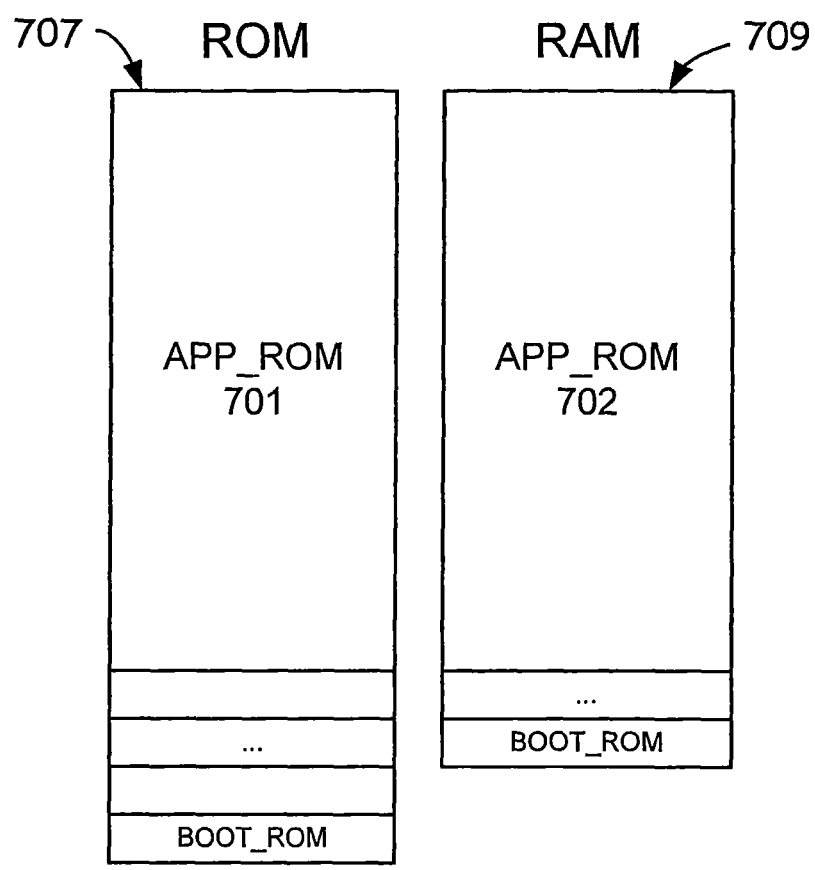
FIG. 7A illustrates the transfer of software from ROM to RAM in firmware without free buffer spaces.

FIG. 7A is a perspective block diagram that depicts exemplary ROM 707 and RAM 709 footprints in a typical mobile handset without the use of the methods described in connection with this invention. During operation, software code from ROM 707 (such as in a FLASH memory) is copied to a designated address location in RAM 709 for execution. In one embodiment, the addresses and references of the objects in ROM correspond to their actual designated locations in RAM during execution. As illustrated, the application software 701 in ROM is copied to RAM as identical application software 702.

Figure 7B:
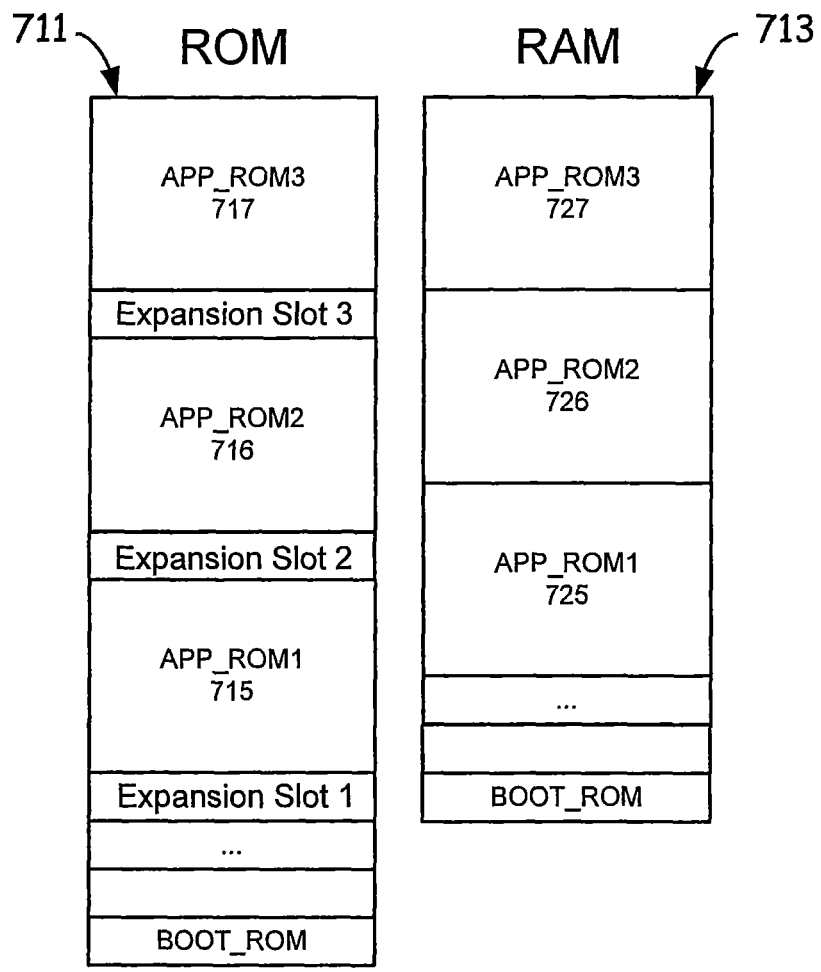
FIG. 7B illustrates the transfer of software from ROM to RAM in firmware with free buffer spaces in accordance with an embodiment of the invention.

In contrast, FIG. 7B is a perspective block diagram that depicts exemplary ROM 711 and RAM 713 footprints in a mobile handset wherein code expansion slots are employed to allow for growth in software code due to updates, in accordance with an embodiment of the invention. The application software 715, 716, 717 in ROM is identically transferred to RAM as application software 725, 726, 727. As a consequence, the mobile handset operates identically to that described in FIG. 7A.

Figure 8:
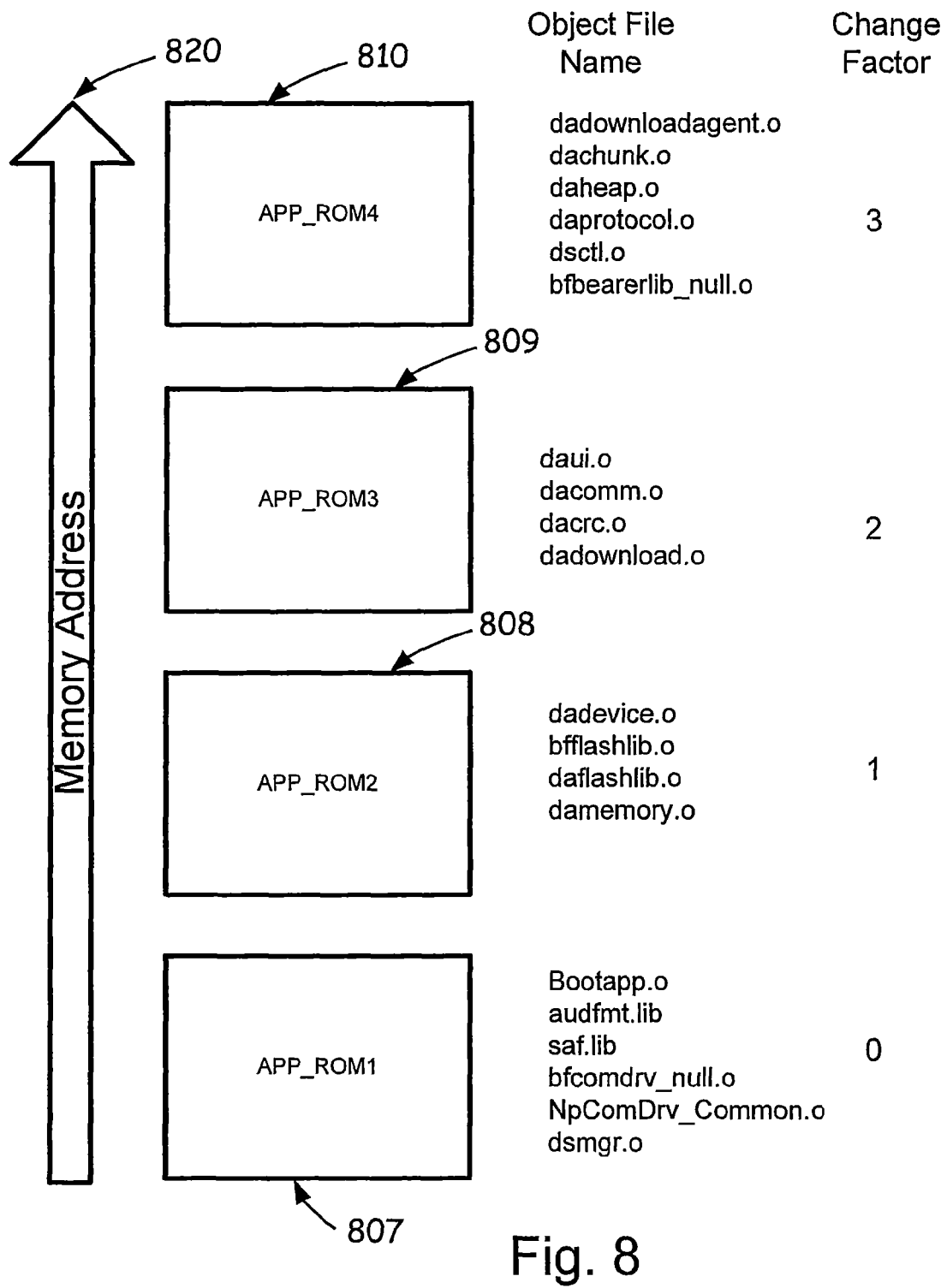
FIG. 8 illustrates groupings of object files based on change factors and their relationship to memory addresses in a device memory in accordance with an embodiment of the invention in accordance with an embodiment of the invention.

FIG. 8 is a perspective block diagram that depicts an exemplary grouping of software objects that is grouped based on their probability of change, according to an embodiment of the invention. The probability of change is termed a change factor. As illustrated, objects having like probability of change are grouped into the same change factor. In this exemplary diagram, the change factor varies from a value of 0 to a value of 3. As illustrated, the objects having the greatest likelihood of change are placed towards the end of memory (at highest address locations) and are assigned a change factor of 3. As shown by the directional arrow 820, the change factors having a higher probability of change are stored in higher address memory locations in ROM. In this exemplary diagram, ROM is divided into four slots labeled APP_ROM1 807, APP_ROM2 808, APP_ROM3 809, and APP_ROM4 810 to accommodate object files with varying change characteristics. Object files Bootapp.o, audfmt.lib, saflib, bfcomdrv_null.o, NpComDrv_Common.o, and dsmgr.o are associated with a zero change factor and are characterized by a low probability of change. As a consequence, they are stored in a low address memory range such as APP_ROM1. On the other hand, object files such as dadownloadagent.o, dachunk.o, daheap.o, daprotocol.o, dsctl.o, and bfbearerlib_null.o are stored in APP_ROM4 810 because these files are considered to have a high probability of change.

Typically, a firmware image may comprise thousands of objects to allow for a fully functional device. When a firmware comprises many thousands of object files, it is contemplated the update methods employed by the embodiments described is of greater significance because of the avalanche or overflow effect described. When such methods are not employed, an update may necessitate using an update package of increased size.

As the amount of available space in memory is limited, it is useful to allocate memory space as effectively as possible. Updates are often necessitated by major bug fixes, performance requirement changes, or new functionalities. Often a user's practical experience is employed to refine the amount of reserved buffer spaces allocated per block of device memory to accommodate for such updates. If experience dictates that a particular object is not going to change during a device's lifetime, it may be desirable to assign it to a slot containing little unused space unless extra space is plentiful. In one embodiment, a weighting factor may be used to multiply an average buffer slot size in the calculation of the amount of reserved buffer space or code expansion space required. It is contemplated that by experimentation and experience, a user may determine the average buffer slot size required.

The selection criteria for grouping objects are also addressed. For example, all objects that were predicted not to change may be grouped together into a common slot at the beginning of memory. In addition, if two or more objects share similar functionality, they may be grouped together. In this instance, it is contemplated the benefit is easier organization and implementation of a particular design.

Figure 9:
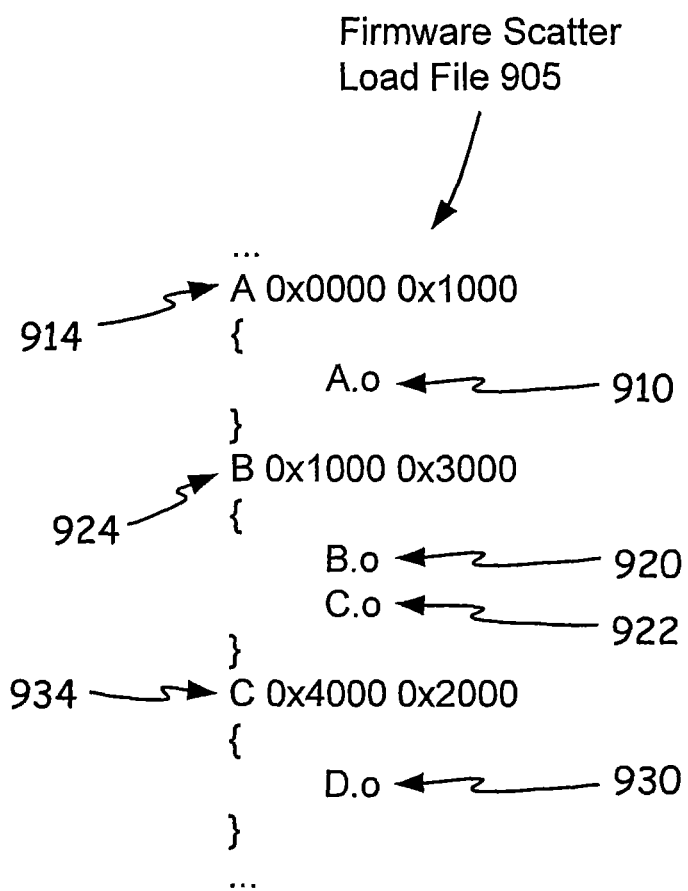
FIG. 9 provides an illustration of an exemplary scatter load file in accordance with an embodiment of the invention.
Figure 10:
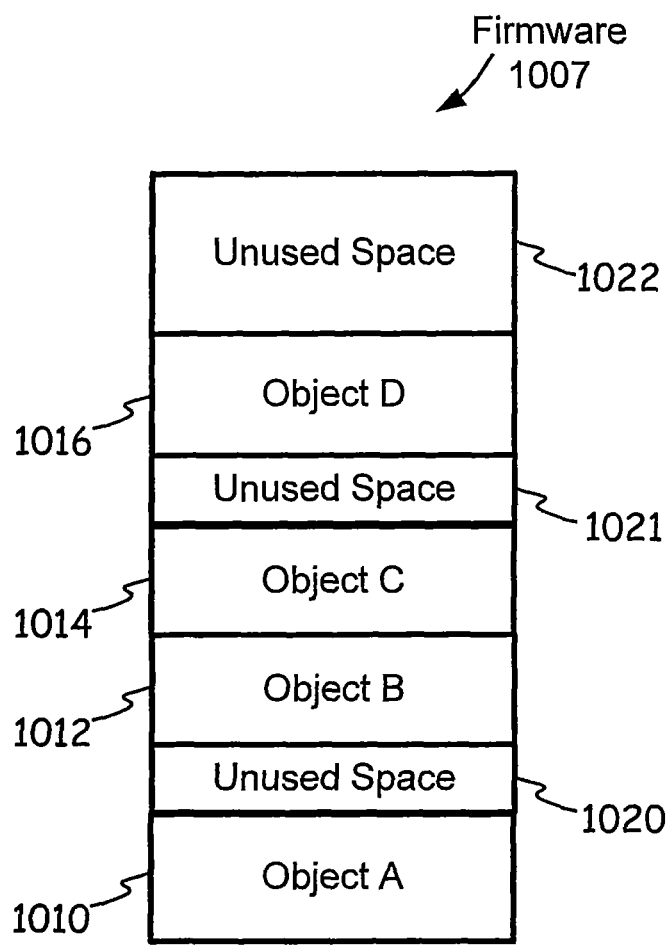
FIG. 10 is a block diagram illustrating objects and unused buffer spaces in firmware loaded on a device memory in accordance with an embodiment of the invention.

In one embodiment, a firmware image intended for release is built by compiling code and organizing the compiled objects into an image. During the build process, a linker generates what may be called a map file. A map file contains the results of the link including the final sizes of objects and their placement in the firmware image. From the map file, the names and sizes of all objects are defined and this information may be subsequently assigned into a device memory's slots. In some cases, objects can be grouped and in other cases single objects could be placed in dedicated slots. As an example, an object A is found in the map file to occupy 24 KB. Because the probability of change for this object is considered high, it is estimated the object might grow to 32 KB in the future. Based on this value, a slot size of 32 KB may be specified in its corresponding scatter load file. With the slot sizes preliminarily defined by a map file, a scatter load file can be used to re-specify each slot or software module size and its associated object files. In one embodiment, a linker is used to place compiled source code into software (firmware). The linker arranges all the compiled objects into a firmware image of which the order of objects in firmware are specified by the scatter load file. This image is then copied into a flash memory of an electronic device. To implement an appropriate layout of memory, a scatter load file may be formatted as follows:

---
Scatter Load File (SLF) Format
---
section-name starting-address size
{
    object file-list
}
--- and has the following definitions:
section-name—An arbitrary label that describes a section, which can be considered a slot.
starting address—Address that specifies where in the final firmware memory the section is placed.
size—The size given to that section.
object file-list—The list of objects to be placed in the section or slot FIGS. 9 and 10 illustrate a set of instructions implementing an exemplary scatter load file 905 and its corresponding mapping of object files 1010 1012 1014 1016 and buffer spaces 1020, 1021, 1022 onto a firmware 1007, in accordance with embodiments of the invention. The scatter load file 905 specifies that an object A 910 is placed in section A 914, objects B 920 and C 922 are placed in section B 924, and an object D 930 is placed in section C 934. Section A 914 may accommodate up to 0x1000 bytes, while section B 924 up to 0x3000 bytes, and section C 934 up to 0x2000 bytes. In the case of section B 924, there are two objects of which the sizes of both objects B 920 and C 922 cannot exceed 0x3000 bytes. If the objects in any section exceed the section size, a linker error may be generated during the build of the firmware.

In one embodiment, a code expansion slot tool (CEST) of the layout preprocessor 115, shown in FIG. 1, may be configured to provide the following:

A per project configuration file that may comprise information such as:
  Number of memory blocks a device memory is divided into
  Change factor values for each memory block
  Scatter load file information such as filename and location.
  Memory size
  Starting and ending addresses in each block of device memory
  Amount and location of reserved buffer space or code expansion slot for each block of device memory
  Map filename and location
  The names of the object files and what blocks they belong to
Automated or manual creation of a scatter load file incorporating code expansion slots
A configuration file for the general tool use that will store the names and locations of each project
Ability to read Map files and determine the following:
  Name of each load and execution block
  Size of each load and execution block
  Name and size of each object file
A graphical user interface provided by the CEST
Provide the user with the ability to input starting and ending information of blocks within device memory
Provide the user the ability to associate one or more groups of object files with a change factor. It is contemplated an exemplary numeric scale for this factor will be as follows:
  0. No changes
  1. Infrequent Changes
  2. Moderate Changes
  3. Frequent Changes
Ability to save a user's personal settings into the project configuration file
Allocation algorithms for configuring memory blocks or slots within a device memory:
  Allocate object files to memory blocks or slots according to its associated change factor such that memory blocks (or slots) at the highest addresses in memory have the greatest available free space
  Allocate free space evenly among the device memory blocks
  Allocate no space for the first two address blocks or slots in device memory, but evenly split the unused free memory space among the remaining memory blocks
  Allocate space based on weighting factors correlated to probability of change and an average reserved buffer size
  It is contemplated other combination of uniform and non-uniform space allocation methodologies may exist and may be implemented
Provide an errata log which comprises the following:
  Date in which error occurs
  Project name associated with error Error message
Diagnostic information
Prompt the user concerning the allocation of single large blocks of device memory for a large software module such as an exemplary main application software module. It is contemplated the CEST may divide this block into a number of sub-blocks. The CEST may alert the user if a block is of a certain maximum size, in order to ensure that block sizes are not too large.
Upon segmentation of large blocks, files may be assigned to the newly segmented memory blocks based on change factor.
Ability of a user to manually map object files or other files with specific ROM blocks.

The code expansion slot method utilizing a scatter load file as embodied in the CEST may provide minimization of update package sizes for many version releases of a firmware image. Just as an initial release requires code change factor estimates and heuristics that are experimented with until a desired slot organization and characteristics are achieved, during any revision work, the slots should not be adjusted until all the changes are implemented and desired characteristics are determined and achieved.

Organizing object code within firmware generally involves evaluating each software object and identifying the objects that are most likely to require modifications or enhancements. This determination may be based on a manufacturer's development cycle, product road map, or other distinguishable metrics. The objects with a high probability of significant modification would then be placed at the top of the firmware image or highest memory address in firmware. If modifications are required after the device's commercial release that result in significant changes to these objects, displacement, relocation, or shifting of objects into other memory blocks or slots would most likely occur. Further, the addition of large updates may overwhelm the reserved memory in one or more slots. However, since these objects were placed at the top of the image, the avalanche effect is limited to the top area of flash, resulting in a smaller update package (used for updates) than would have been generated (by a generator 107) if these objects were located at the bottom of the image.

In summary, aspects of the present invention provide a number of embodiments of a system and method to effectively initialize and update firmware in an electronic device. In one embodiment, the version of software resident in a device's memory and the location and size of unused free memory are determined by initializing the device's memory with one or more pre-determined binary patterns. In one embodiment, buffer spaces are inserted between software modules in a device's firmware to allow for expansion of a particular software module by way of a future update. In one embodiment, one or more software modules (or objects) are inserted into pre-configured code expansion slots in device's firmware. The memory space that remains after all objects are inserted into a slot provides buffer space to allow for future updates to these objects.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An electronic device having updatable non-volatile memory, the device comprising:
    a processor coupled to the non-volatile memory and to interface circuitry for communication via a network, the processor to:
        receive over the network, a package of information for updating the memory to an updated code version;
        initialize one or more otherwise unused portions of the memory with a binary pattern representative of version information for the updated code version, wherein the one or more otherwise unused portions of the memory are in accordance with one or more memory layout specifications resulting from computing an available free space of the memory and an available free space associated with the updated code version and distributing the available free space of the memory and the available free space associated with the updated code version across the memory as buffer spaces associated with software modules stored in the memory, wherein each buffer space of the buffer spaces is a respective size based upon a particular probability of expansion of a respective software module associated with the buffer space to accommodate future expansion of the respective software module, wherein the available free space associated with the updated code version is different than the available free space of the memory;
        after initializing the memory, process the package of information to update the memory to the updated code version; and
        after the initialization and the updating, locate the one or more otherwise unused portions of the memory by identifying the binary pattern in the memory.

2. The electronic device according to claim 1, wherein the electronic device comprises a handheld communication device.

3. The electronic device according to claim 2, wherein the electronic device is a cellular phone.

4. The electronic device according to claim 2, wherein the electronic device is a handheld device.

5. The electronic device according to claim 1, wherein the nonvolatile memory is semiconductor memory.

6. The electronic device according to claim 5, wherein the semiconductor memory is flash memory.

7. The electronic device according to claim 1, wherein the package of information for updating the memory comprises a set of instructions executed by code in the electronic device.

8. The electronic device according to claim 1, wherein the updated code version is generated from an existing code version by reusing contents of one or more memory locations of the existing code version and content from the package of information for updating the memory.

9. The electronic device according to claim 1, wherein the package of update information is received and stored in its entirety in the electronic device, prior to beginning updating of the memory.

10. The electronic device according to claim 1, wherein the package of information for updating the memory is received and the updating is performed during the manufacture of the electronic device.

11. A method of operating an electronic device having updatable non-volatile memory, the method comprising:
    receiving over a network, a package of information for updating the memory to an updated code version;
    after receiving the package of information, initializing one or more otherwise unused portions of the memory with a binary pattern representative of version information for the updated code version, wherein the one or more otherwise unused portions of the memory are in accordance with one or more memory layout specifications resulting from computing an available free space of the memory and an available free space associated with the updated code version and distributing the available free space of the memory and the available free space associated with the updated code version across the memory as buffer spaces associated with software modules stored in the memory, wherein each buffer space of the buffer spaces is a respective size based upon a particular probability of expansion of a respective software module associated with the buffer space to accommodate future expansion of the respective software module, wherein the available free space associated with the updated code version is different than the available free space of the memory;

after initializing the memory, processing the package of information to update the memory to the updated code version; and after the initialization and the updating, locate the one or more otherwise unused portions of the memory by identifying the binary pattern in the memory.

12. The method according to claim 11, wherein the electronic device comprises a handheld communication device.

13. The method according to claim 12, wherein the electronic device is a cellular phone.

14. The method according to claim 11, wherein the non-volatile memory is semiconductor memory.

15. The method according to claim 14, wherein the semiconductor memory is flash memory.

16. The method according to claim 11, wherein the package of information for updating the memory comprises a set of instructions executed by code in the electronic device.

17. The method according to claim 11, wherein the updated code version is generated from an existing code version by reusing contents of one or more memory locations of the existing code version and content from the package of information for updating the memory.

18. The method according to claim 11, wherein the package of update information is received and stored in its entirety in the electronic device, prior to beginning updating of the memory.

19. An electronic device having updatable non-volatile memory, the device comprising:

a one processor coupled to the non-volatile memory and to interface circuitry for communication via a network, the processor to:

receive a package of information for updating the memory;

initialize one or more otherwise unused portions of the memory with a binary pattern representative of software code version information, wherein the one or more otherwise unused portions of the memory are in accordance with one or more memory layout specifications resulting from computing an available free space of the memory and an available free space associated with the software code version and distributing the available free space of the memory and the available free space associated with the software code version across the memory as buffer spaces associated with software modules stored in the memory, wherein each buffer space of the buffer spaces is a respective size based upon a particular probability of expansion of a respective software module associated with the buffer space to accommodate future expansion of the respective software module, wherein the available free space associated with the updated code version is different than the available free space of the memory;

after initializing the memory, update one or more portions of memory with software code of a version represented by the binary pattern; and after the initialization and the updating, locate the one or more otherwise unused portions of the memory by identifying the binary pattern in the memory.

* * * * *